United States Patent [19]

Debus

[11] Patent Number: 4,802,863

[45] Date of Patent: Feb. 7, 1989

[54] DEVICE FOR ELECTRICAL CONNECTION OF TWO COMPONENTS

[75] Inventor: Jurgen Debus, Dietzholztal, Fed. Rep. of Germany

[73] Assignee: Rittal-Werk Rudolf Loh GmbH & Co. KG, Herborn, Fed. Rep. of Germany

[21] Appl. No.: 185,448

[22] Filed: Apr. 25, 1988

[30] Foreign Application Priority Data

Apr. 30, 1987 [DE] Fed. Rep. of Germany ....... 3714500

[51] Int. Cl.$^4$ .............................................. H01R 9/24
[52] U.S. Cl. .................................... 439/387; 439/431; 439/801
[58] Field of Search ................. 439/95, 387, 431, 801; 411/968, 970

[56] References Cited

U.S. PATENT DOCUMENTS 3,609,654  9/1971  Wallo .................................. 439/801

Primary Examiner—Joseph H. McGlynn

[57] ABSTRACT

This invention concerns a device for establishing an electrically conductive connection between flat areas of two components which are made of metal with a substantially non-conductive coating and are held together by a nut and bolt through aligned boreholes. An electrically conductive connection with damaged areas on surfaces not visible from one side is made possible by various features, including: the borehole of the component beside the nut is enlarged to serve as a holding aperture; a claw retainer is permanently non-rotatably secured on the free side of the nut and rests with punch-cut claws of side legs on the side of the component which faces the nut; and the side legs of the claw retainer have U-shaped extensions passing through the holding aperture adjacent to the nut having additional punch-cut claws engaging the other component, which is away from the nut, on the side thereof which faces the component adjacent to the nut.

10 Claims, 1 Drawing Sheet

U.S. Patent  Feb. 7, 1989  4,802,863
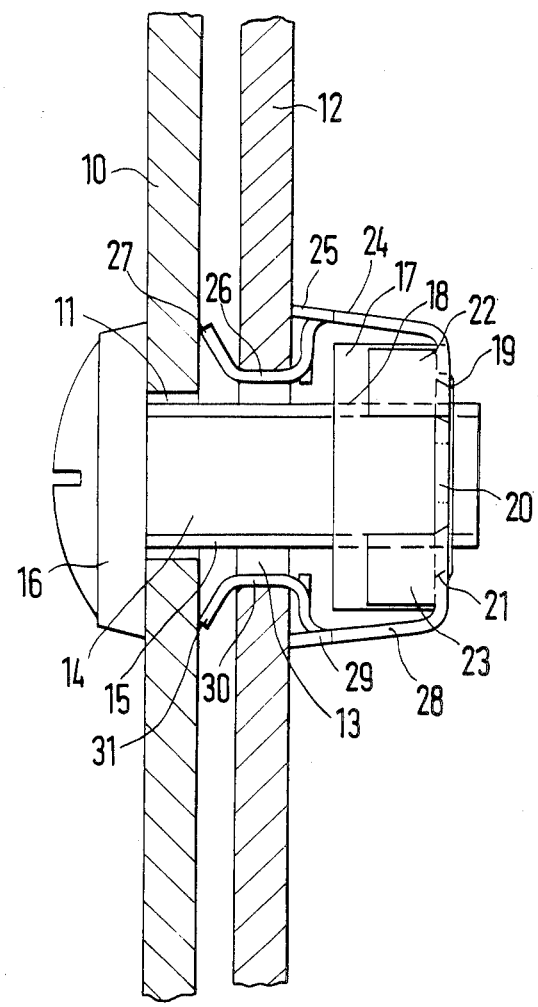

DEVICE FOR ELECTRICAL CONNECTION OF TWO COMPONENTS

FIELD OF THE INVENTION

This invention relates to devices for electrically conductive interconnection of flat areas of two metal components of the type coated with a substantially non-conductive surface layer and having aligned boreholes in their flat areas to receive a connecting nut and bolt.

BACKGROUND OF THE INVENTION

In order to obtain electric contact in the area of the screw connection in such devices, it has been customary to remove part of the surface in the areas around the boreholes or to take measures, in applying the protective coating, to assure that the protective layer is not applied in such areas. This, however, always requires an additional operation during manufacture, which increases costs. Furthermore, such screw connections must be tightened exactly and not be moved later. But this cannot always be guaranteed, as in the case of modifications in a switchboard where bar rails are added later or attached to the body of the console elsewhere.

As shown by German Utility Patent No. 8,001,886, a threaded component can be connected in an electrically conductive manner to a board-shaped component by providing the nut with teeth or the like on the side which faces the component such that the teeth penetrate the surface layer when the nut is tightened. This establishes direct electrically-conductive connection with the component. However, such nuts of the prior art do not permit a connection of two components in a manner permitting electrical conduction if both components are coated with a substantially non-conductive coating.

This could be achieved if the head of the screw of a screw connection were also provided with teeth or the like on its side facing the component. However, this has the disadvantage that the surface layer would be destroyed in the area of such head. Then, in event of alterations or changes in position of the screw connections, the damaged areas of the surface layers of both components would be visible.

OBJECT OF THE INVENTION

The purpose of this invention is to provide a connector device of the type first described above in which the two components can be electrically joined in a manner such that the surface layer of a least one component is damaged only where it is not exposed to view so that a subsequent change in the position of the screw connections is possible without exposing damaged areas of the surface layer.

SUMMARY OF THE INVENTION

This invention solves this problem in the following manner: The borehole through the component which faces the nut is enlarged to form a holding aperture. A claw retainer, which has side legs, is permanently and immovably fixed on the free side of the nut so that it rests with punch-cut claws on its side legs engaging the side of the component which faces the nut. The side legs of the claw retainer have U-shaped extensions which pass through the holding aperture of the component beside the nut. The extensions have additional punch-cut claws beyond and outside the holding aperture which engage the other component on its side facing the component which in turn faces the nut.

In this arrangement the head of the bolt is inserted from the visible side so it rests only on the surface of the component which is away from the nut. Then the component engaging the head of the bolt has surface damage only on the side thereof which cannot be seen, that is, the side which is next to the component beside the nut.

The extensions of the side legs of the claw retainer pass through the holding aperture in the component which is beside the nut and form the claws engaging the component away from the nut on its side facing the nut. The claw retainer and the nut together form a unit which can be snapped into the holding aperture of the component beside the nut. The bolt then need only be passed through the borehole and holding aperture of the two components and screwed into the threaded hole of the nut.

The permanent attachment of the claw retainer to the nut is achieved simply by the fact that the claw retainer has a passageway in its middle portion into which a projection of the nut of matching cross-section fits, and the claw retainer is permanently joined to the nut by deformation of this projection.

The nut may be provided with flattened faces on opposite sides of its periphery and the side legs of the claw retainer may enclose the nut on two opposite sides while tabs on the middle portion of the claw retainer are bent onto the flattened parts of the nut. This secures the claw retainer on the nut so that it cannot be twisted even if the passageway in the middle portion of the claw retainer and the projection on the nut both have round cross-sections. The nut itself may have a square cross-section or it may have a round cross-section with the two flattened faces.

Double contacting of the side legs of the claw retainer with the component beside the nut is achieved according to another embodiment by having each extension pass between two claws on the side legs and bent into a U shape.

Snapping of the combined nut and claw retainer into the holding aperture of the component beside the nut is facilitated by virtue of the fact that the U-shaped extensions themselves form fixtures for engaging the edge of the holding aperture in the component which is beside the nut.

Double contacting of the extensions is easily achieved with the component which is away from the nut by dividing the end areas of the side leg extensions by means of slits into two claws.

The extensions can determine the terminal position of the tightened screw connection by virtue of the fact that they have first leg portions running approximately parallel to the surface of the component beside the nut, extending between the nut and such component.

Penetration through the surface layers is facilitated by the fact that each of the claws of the claw retainer terminate in sharp edges or points.

The claw retainer can be produced as an inexpensive part if it is designed and manufactured as a punch-cut and bent part and is made of a spring metal. Due to the spring properties of such material, the claws are always kept under tension on the respective components. This assures low contact resistance at the support points of the claws.

According to a preferred embodiment, the bolt is located with its head on the visible side of the component away from the nut. This allows the screw connection to be moved at any time without leaving visible destroyed areas in the surface area.

BRIEF DESCRIPTION OF THE DRAWING

The FIGURE is a sectional view of a practical embodiment of the invention which will now be explained in greater detail.

DETAILED DESCRIPTION OF PREFERRED EMBODIMENT

The screw interconnection of bolt 14 and nut 17 is established through borehole 11 and holding aperture 13 of the two components 10 and 12, respectively, which are both designed to be flat in the area of the connection. Component 10 is located on the visible side and bolt 14 is inserted from this side into borehole 11 by means of head 16. Holding aperture 13 in component 12, which faces nut 17, is enlarged.

Nut 17 is attached to claw retainer 20. On the side facing away from component 12, nut 17 has a projection 19 which is guided through passageway 21 in the middle portion of claw retainer 20 and then deformed. Thus, claw retainer 20 is permanently secured to nut 17. If passageway 21 in the middle portion of claw retainer 20 and projection 19 of nut 17 have a square cross-section, then claw retainer 20 is also connected to nut 17 in a manner such that it cannot be twisted. For technical manufacturing reasons, passageway 21 in the middle portion of claw retainer 20 and projection 19 may have round cross-sections. Claw retainer 20 is then secured with the bent tabs 22 and 23 on opposite sides of nut 17, which has a square cross-section so it cannot twist. Nut 17 may have an essentially round cross-section with two diametrically opposite flattened faces onto which tabs 22 and 23 are bent.

Holding aperture 13 may have either a square or a round cross-section. Extensions 26 and 30 are matched to the cross-section of holding aperture 13 so that the combination of nut 17 and claw retainer 20 can be snapped into position.

Side legs 24 and 28 of claw retainer 20 enclose the two sides of nut 17 that are not covered by tabs 22 and 23. Side legs 24 and 28 rest with two claws 25 and 29 on the side of component 12 which faces nut 17. Side legs 24 and 28 have extensions 26 and 30 which pass between claws 25 and 29 and are bent into a U shape. Extensions 26 and 30 themselves form fixtures for holding component 12 against the wall of holding aperture 13 so the unit of nut 17 and claw retainer 20 can easily be snapped or locked into holding aperture 13. The holding fixtures which are extensions 26 and 30 are matched to the thickness of component 12.

Claw retainer 20 is designed as a punch-cut and bent part made of spring metal. The ends of extensions 26 and 30 are subdivided by slits, so two claws 27 and 31 rest on the side of component 10 which faces component 12. Bolt 14 is inserted through borehole 11 and holding aperture 13 and threaded part 15 of bolt 14 is screwed into the threaded hole 18 of nut 17. When bolt 14 is tightened, side legs 24 and 28 are deformed, and clamping forces act on claws 25 and 29 and additional claws 27 and 31. The sharp edges or tips of claws 25, 27, 29 and 31 penetrate through the surface layers of components 10 and 12 so a definite electrical connection is established over claw retainer 20. The forces acting on claws 25, 27, 29 and 31 assure a low contact resistance. Extensions 26 and 30 have first leg portions that extend from side legs 24 and 28 approximately parallel to the face of component 12 and thus run between component 12 and nut 17 so they can serve as a limit for the clamping movement of claw retainer 20.

If the side of component 10 which faces head 16 of bolt 14 is designated as the front side, then the only surface layers which are damaged and perforated are the rear sides of components 10 and 12. Therefore, if bolt 14 is loosened, no damage to the surface layer of components 10 and 12 is visible from the front side. The screw connection can therefore readily be moved.

While the principles of this invention have been described in connection with specific embodiments, it should be understood clearly that these descriptions are made only by way of example and are not intended to limit the scope of the invention.

I claim:

1. In an electrical connection device of the type having first and second principal components with opposed flat areas, first and second aligned boreholes in the first and second components, respectively, a bolt with a shank extending through the boreholes from a front surface of the first principal component, and a nut engaging the shank against a back surface of the second principal member and having a free side away from the second principal component, the principal components of metal with a non-conductive coating, the improvement comprising:

the second borehole, adjacent the nut, being larger than the bolt shank such that there is substantial clearance between the shank and the edge of the second borehole;

a claw retainer non-rotatably secured on the free side of the nut;

a side leg connected to the claw retainer and having a first claw engaging the back surface of the second principal component; and an extension extending from the claw member, passing through said clearance, and having a second claw engaging the first principal component on its surface opposite the front surface.

2. The device of claim 1 wherein:

the claw retainer has a middle portion with a passageway therethrough;

a projection extends from the nut and into said passageway, the projection and passageway matching, said projection being deformable; and the claw retainer permanently joined to the nut by deformation of said projection.

3. The device of claim 1 wherein:

the nut has flattened surfaces on opposite sides of its periphery;

the side legs enclose the nut on two opposite sides; and tabs extend from the middle portion of the claw retainer and are bent down onto said flattened surfaces of the nut, thereby non-rotatably securing the claw retainer to the nut.

4. The device of claim 1 wherein:

there are a pair of first claws on the side leg;

the extension passes between such two claws; and the extension is U-shaped to extend around the edge of the second borehole.

5. The device of claim 4 wherein there are a plurality of U-shaped extensions, such U-shaped extensions themselves forming a fixture for holding the second principal component by engaging the edge of said second borehole.

6. The device of claim 5 wherein:
the claws are punch-cut;
the extensions each extend from a side leg; and
the extensions of the side legs are each subdivided by slits in the end area, each leg terminating in two claws.

7. The device of claim 1 wherein the extension has a first leg running substantially parallel to the back surface of the second principal component, between the nut and the second principal component.

8. The device of claim 1 wherein the claws have sharp ends.

9. The device of claim 1 wherein the claw retainer is a punch-cut and bent part made of spring metal.

10. The device of claim 1 wherein the bolt has a head positioned on the front surface, which is the visible side.

* * * * *